(12) United States Patent
Goto

(10) Patent No.: US 6,249,376 B1
(45) Date of Patent: Jun. 19, 2001

(54) PROJECTION SCREEN

(75) Inventor: Masahiro Goto, Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/284,566

(22) PCT Filed: Sep. 10, 1998

(86) PCT No.: PCT/JP98/04086

§ 371 Date: Apr. 16, 1999

§ 102(e) Date: Apr. 16, 1999

(87) PCT Pub. No.: WO99/14633

PCT Pub. Date: Mar. 25, 1999

(30) Foreign Application Priority Data

Sep. 12, 1997 (JP) .................................................. 9-248300

(51) Int. Cl.$^7$ .................................................. G03B 21/60
(52) U.S. Cl. .................................................. 359/457
(58) Field of Search .................................. 359/456, 455, 359/457, 453, 460, 443

(56) References Cited

U.S. PATENT DOCUMENTS

| 2,567,654 | 9/1951 | Siezen . |
| 4,725,134 | 2/1988 | Ogino . |
| 5,177,637 | * 1/1993 | Tsukada ............................... 359/599 |

FOREIGN PATENT DOCUMENTS

| 56-052985 | 5/1981 | (JP) . |
| 3 683 65 | 11/1982 | (JP) . |
| 3 729 72 | 1/1984 | (JP) . |
| 59-095525 | 6/1984 | (JP) . |
| 60-263932 | 12/1985 | (JP) . |
| 62-236282 | 10/1987 | (JP) . |
| 3-149540 | 6/1991 | (JP) . |
| 7-128743 | 5/1995 | (JP) . |
| 8-101459 | 4/1996 | (JP) . |

\* cited by examiner

*Primary Examiner*—Safet Metjahic
*Assistant Examiner*—E P LeRoux
(74) *Attorney, Agent, or Firm*—Parkhurst & Wendel, L.L.P.

(57) ABSTRACT

The present invention provides a projection screen in which both primary and secondary moiré patterns never become conspicuous even when the pitch of lenticular lenses is made fine. When the pitch of the concentric circular grooves on the Fresnel lens face 2 of a tranparent base 1 is indicated by $p_F$, the repeating pitch of the cylindrical lens faces on the lenticular lens face 3 is indicated by $p_L$, the pitch of the elliptical moiré is indicated by $p_E$, the pitch of the hyperbolic moiré is indicated by $p_H$, and when $p_E$ and $p_H$ are defined as follows: in the case where $p_L > p_F$, $p_E = 1.0/(1.0/p_F - [p_L/p_F]/p_L)$ $p_H = 1.0/(1.0/p_L - 1.0/p_F + [p_L/p_F]/p_L)$, and in the case where $p_F > p_L$, $p_H = 1.0/(1.0/p_L - [p_F/p_L]/p_F)$ $p_E = 1.0/(1.0/p_F - 1.0/p_L + [p_F/p_L]/p_F)$ ([X]: the integer part of X), the relationship $p_E/p_H \geq 2.4$ or $p_H/p_E \geq 2.4$ is fulfilled. Further, the relationship MAX($p_H$, $p_E$) < 1.5 mm is fulfilled.

5 Claims, 5 Drawing Sheets

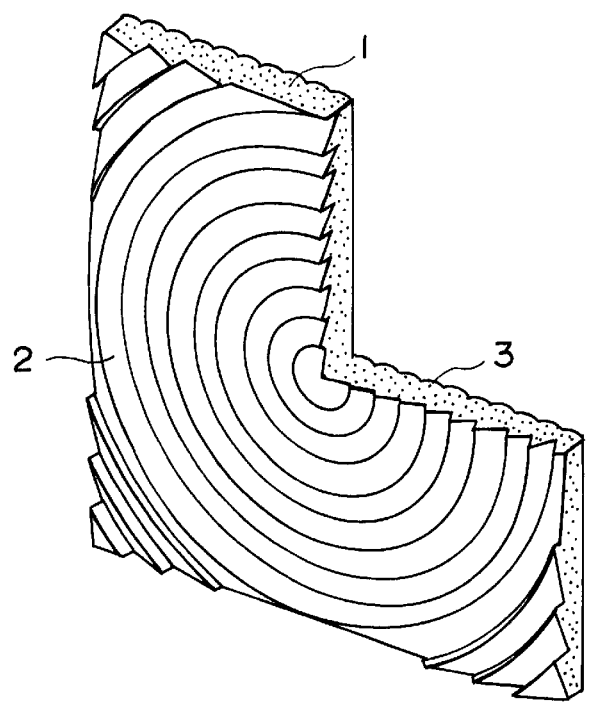
F I G. 1
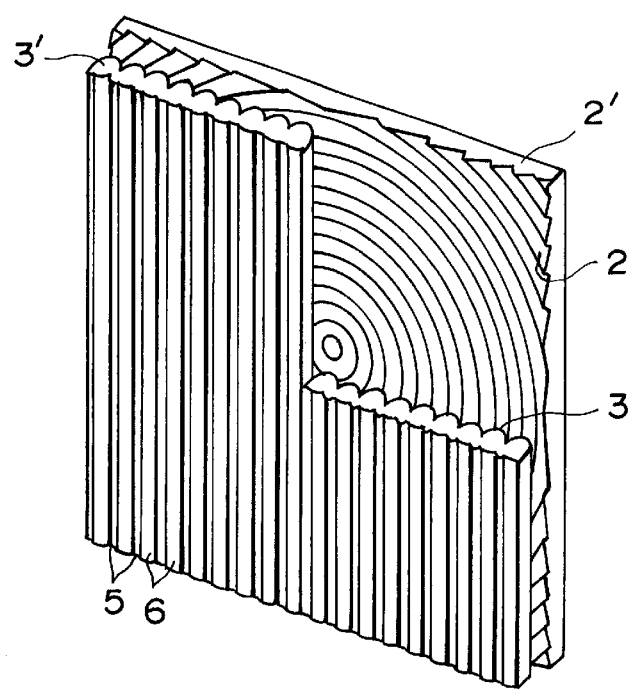
F I G. 2

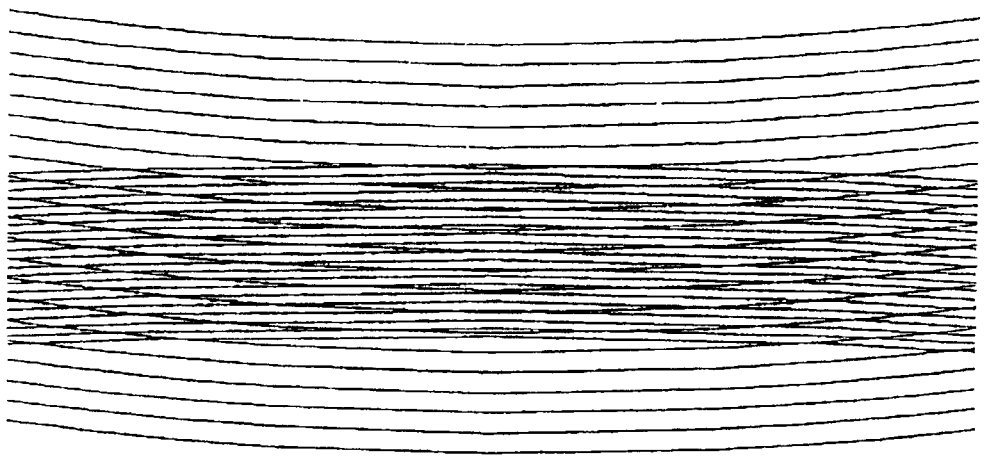
F I G. 4
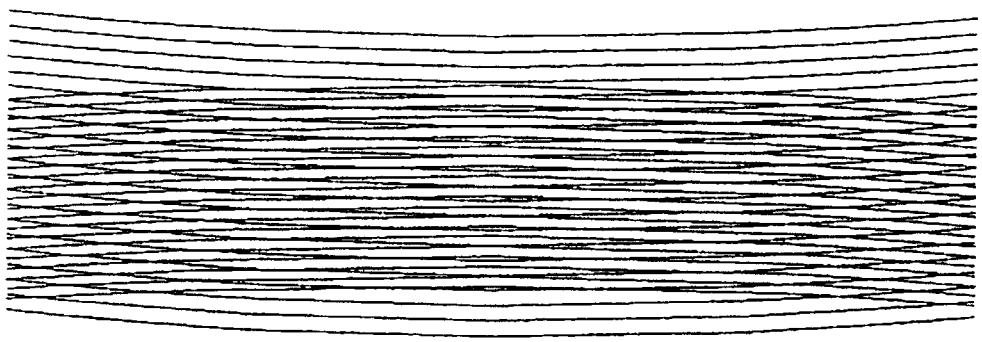
F I G. 5

PROJECTION SCREEN

TECHNICAL FIELD

The present invention relates to a projection screen, and, more particularly, to a projection screen so made that especially a moiré pattern which is produced due to the cyclic structure of a Fresnel lens and that of lenticular lenses will be obscure.

BACKGROUND ART

In projection televisions or projection screens for projectors, which are a combination of a Fresnel lens and lenticular lenses, a moiré pattern that is produced due to a group of concentric circles on the Fresnel lens and a group of parallel straight lines of the lenticular lenses is known to be either elliptical or hyperbolic depending on the pitch ratio between these two groups (see U.S. Pat. No. 2,567,654). FIG. 6 is a view showing one example of the moiré pattern in the shape of an ellipse (hereinafter also referred to simply as "elliptical moiré"); and FIG. 7 is a view showing one example of the moiré pattern in the shape of a hyperbola (hereinafter also referred to simply as "hyperbolic moiré"). In FIG. 6, the elliptical moiré is such that its focal point corresponds to the center of the Fresnel lens. Further, in FIG. 7, the asymptotic lines of the hyperbolic moiré are those two lines that cross each other at the center of the Fresnel lens. It is noted that the angle formed with these asymptotic lines varies depending on the pitch ratio between the lenticular lenses and the Fresnel lens.

In many cases, perceived by an observer is generally either one of the moiré patterns of these two types. In practice, however, the moiré patterns of these two types are simultaneously produced. When the pitch ratio between the lenticular lenses and the Fresnel lens is n+0.5 (n: integer), the intensities of the moiré patterns of the two types become lowest, and the cycles (pitches) of these moiré patterns become identical (see Japanese Patent Laid-Open Publication No. 52985/1981). Even if the pitch ratio between the lenticular lenses and the Fresnel lens only slightly deviates from n+0.5, the cycles (pitches) of the two moiré patterns do not agree with each other, and a secondary moiré pattern is produced by the moiré patterns of these two types. This secondary moiré pattern is scalelike, and produced on the transverse axis of the lenticular lenses in the repeating direction.

This secondary moiré pattern is minimized when the pitch ratio between the lenticular lenses and the Fresnel lens is in the vicinity of n+0.4, or of n+0.6 (see Japanese Patent Publications No. 68365/1991 and No. 72972/1991). However, when the pitch ratio between the lenticular lenses and the Fresnel lens is in the vicinity of n+0.4, or of n+0.6, the intensity of the primary moiré pattern (elliptical moiré or hyperbolic moiré) will not become so low. In the conventional projection screens, the pitch of the lenticular lenses is approximately 0.7 to 1.0 mm, and that of the Fresnel lens is approximately 0.1 to 0.15 mm, so that the pitch of the primary moiré pattern (elliptical moiré or hyperbolic moiré) which varies relative to the pitch of the lenticular lenses becomes relatively large. For this reason, the conventional projection screens have such a problem that the primary moiré pattern (elliptical moiré or hyperbolic moiré) tends to become conspicuous due to the size of its pitch.

SUMMARY OF THE INVENTION

On the other hand, it has recently become possible to successfully produce highly minute projection screens, and there is even such a case where the pitch of the lenticular lenses is made 0.2 mm or less. In this case, if the pitch of the Fresnel lens is approximately 0.1 to 0.15 mm, the pitch of the lenticular lenses and that of the Fresnel lens become close to each other (that is, the integer part (n) of the pitch ratio becomes 1 or 2), and the intensities of both the primary and secondary moiré patterns become high. It is noted that there is the following problem in this case: regarding the primary moiré pattern, the pitch thereof becomes small, so that this pattern becomes obscure; on the contrary, with respect to the secondary moiré pattern, the pitch thereof is to have such a size that this pattern will be conspicuous.

The present invention was accomplished in the light of the foregoing. An object of the present invention is to provide a projection screen comprising lenticular lenses and a Fresnel lens in combination, in which both primary and secondary moiré patterns will never be conspicuous even when the pitch of the lenticular lenses is made fine.

The present invention provides a projection screen comprising a Fresnel lens and lenticular lenses in combination, wherein, when the pitch of the lenticular lenses is indicated by $p_L$, and the pitch of the Fresnel lens is indicated by $p_F$, and when $p_E$ and $p_H$ are defined as follows: in the case where $p_L > p_F$, $$p_E = 1.0/(1.0/p_F - [p_L/p_F]/p_L) \quad \text{(i)}$$

$$p_H = 1.0/(1.0/p_L - 1.0/p_F + [p_L/p_F]/p_L) \quad \text{(ii), and}$$

in the case where $p_F > p_L$, $$p_H = 1.0/(1.0/p_L - [p_F/p_L]/p_F) \quad \text{(iii)}$$

$$p_E = 1.0/(1.0/p_F - 1.0/p_L + [p_F/p_L]/p_F) \quad \text{(iv)}$$

([X]: the integer part of X), the relationship $$p_E/p_H \geq 2.4 \text{ or } p_H/p_E \geq 2.4$$

is fulfilled.

In the present invention, it is preferable that $p_E$ and $p_H$ also fulfill the following relationship:

$$\text{MAX}(p_E, p_H) < 1.5 \text{ mm}.$$

According to the present invention, since the pitches $p_E$ and $p_H$ of the elliptical moiré and hyperbolic moiré which are produced by the cyclic structure of the lenticular lenses and that of the Fresnel lens fulfill the above-described relationship, both the primary and secondary moiré patterns will never be conspicuous even when the pitch of the lenticular lenses is made fine, and a projected image can be observed clearly.

BRIEF DESCRIPTION OF THE DRAWINGS

In the drawings,

FIG. 1 is a perspective view showing one constitution of a typical projection screen to which the present invention is applied;

FIG. 2 is a perspective view showing another constitution of a typical projection screen to which the present invention is applied;

FIG. 4 is a view showing the secondary moiré pattern produced in Example 6 to which the present invention was applied;

FIG. 5 is a view showing the secondary moiré pattern produced in Comparative Example 2;

BEST MODE FOR CARRYING OUT THE INVENTION

The principle of the present invention, and an embodiment of the projection screen to which the present invention is applied will be described hereinafter.

Figure 3A:
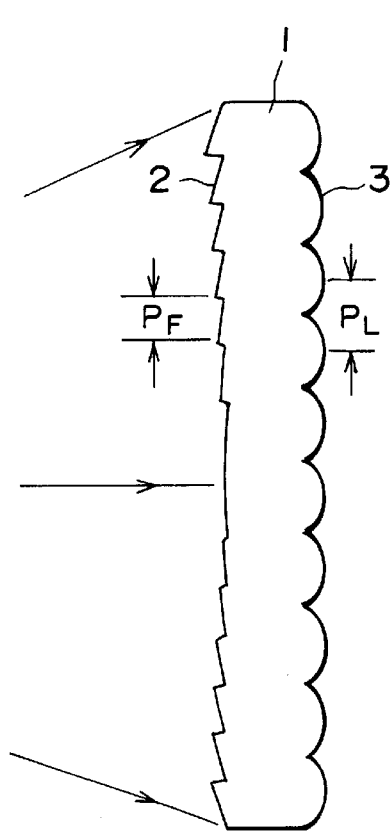
FIG. 3A is a horizontal sectional view of the projection screen shown in FIG. 1.

FIGS. 1 and 3A are views showing one example of a typical projection screen to which the present invention is applied. Of these figures, FIG. 1 is a perspective view of the projection screen as seen from the projection side; and FIG. 3A is a horizontal sectional view of the projection screen shown in FIG. 1.

As shown in FIGS. 1 and 3A, this projection screen is composed of a transparent base 1, and this transparent base 1 is provided with a Fresnel lens face (Fresnel lens) 2 and a lenticular lens face (lenticular lenses) 3 on its projection side and observation side, respectively. On the Fresnel lens face 2 of the transparent base 1, a plurality of concentric circular grooves (cyclic structure) are formed; and, on the lenticular lens face 3 of the same, a plurality of fine cylindrical lens faces (cyclic structure) are arranged in parallel. Further, the pitch of the concentric circular grooves on the Fresnel lens face 2 is $p_F$, and the repeating pitch of the cylindrical lens faces on the lenticular lens face 3 is $p_L$; these pitches $p_F$ and $p_L$ do not, in general, agree with each other, and, specifically, fixed so that they can fulfill the relationship which will be described later.

Figure 3B:
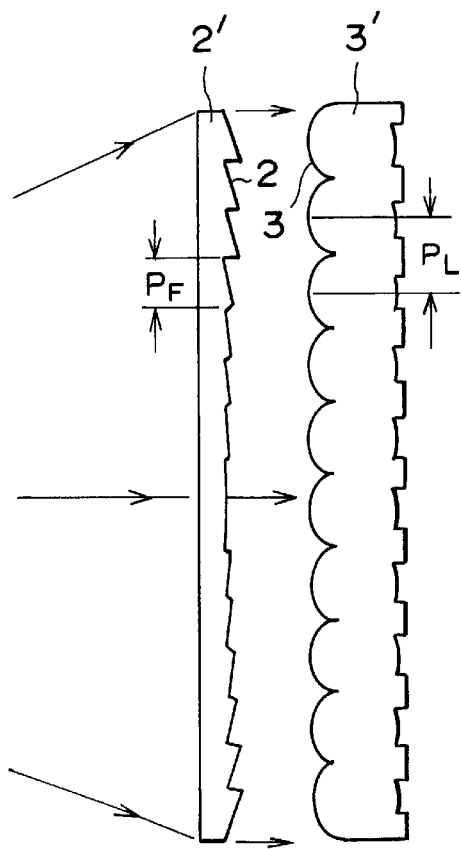
FIG. 3B is a horizontal sectional view of the projection screen shown in FIG. 2.
Figure 6:
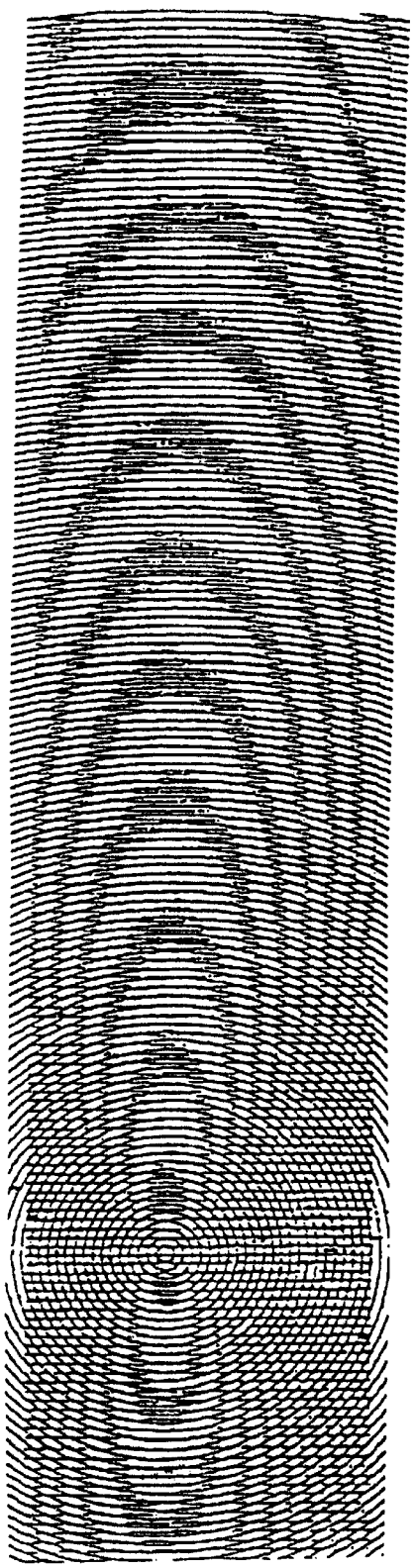
FIG. 6 is a view showing one example of those elliptical moirés which are produced on projection screens.
Figure 7:
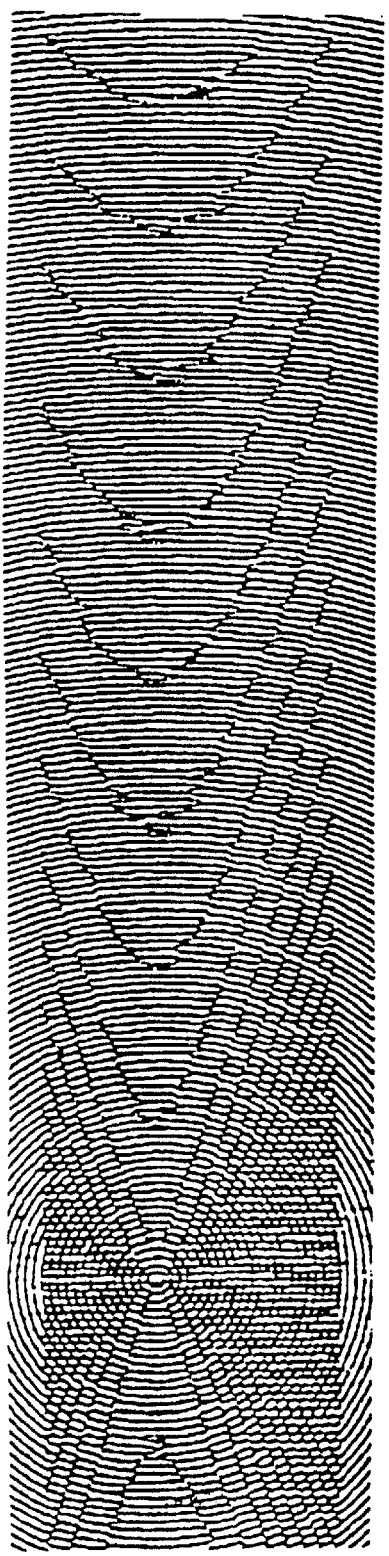
FIG. 7 is a view showing one example of those hyperbolic moirés which are produced on projection screens.

FIGS. 2 and 3B are views showing another example of a typical projection screen to which the present invention is applied. Of these figures, FIG. 2 is a perspective view of the projection screen as seen from the observation side, and FIG. 3B is a horizontal sectional view of the projection screen shown in FIG. 2.

As shown in FIGS. 2 and 3B, this projection screen comprises a Fresnel lens sheet 2' and a lenticular lens sheet 3' in combination, with the Fresnel lens face (Fresnel lens) 2 of the Fresnel lens sheet 2' and the lenticular lens face (lenticular lenses) 3 of the lenticular lens sheet 3' facing each other. On the Fresnel lens face 2 of the Fresnel lens sheet 2', a plurality of concentric circular grooves (cyclic structure) are formed; and, on the lenticular lens face 3 of the lenticular lens sheet 3', a plurality of fine cylindrical lens faces (cyclic structure) are arranged in parallel. Further, the pitch of the concentric circular grooves on the Fresnel lens face 2 is $p_F$, and the repeating pitch of the cylindrical lens faces on the lenticular lens face 3 is $p_L$; these pitches $p_F$ and $p_L$ do not, in general, agree with each other, and, specifically, fixed so that they can fulfill the relationship which will be described later. On the observation-side surface of the lenticular lens sheet 3' (the surface opposite to the lenticular lens face 3), black stripes 5 are provided on the non-light-condensing parts thereof and cylindrical lens faces 6 are provided on the light-condensing parts of the same so that they correspond to the repeating pitches of the cylindrical lens faces on the lenticular lens face 3. The cylindrical lens faces 6 which are provided on the observation-side surface of the lenticular lens sheet 3' may be made plane, and, moreover, the black stripes may be omitted if they are unnecessary.

In the transparent base 1 shown in FIGS. 1 and 3A, and in one of or both of the transparent base of the Fresnel lens sheet 2' and that of the lenticular lens sheet 3' shown in FIGS. 2 and 3B, it is preferable to incorporate a diffusing agent for diffusing projected light, comprising silica particles and the like.

The desirable relationship between the pitches $p_F$ and $p_L$ of the Fresnel lens and lenticular lenses in the aforementioned projection screen will be described hereinafter.

As described in the foregoing BACKGROUND ART, in the conventional projection screens, the primary moiré patterns are reduced, in general, by allowing the pitch ratio $p_L/p_F$ or $p_F/p_L$ between the lenticular lenses and the Fresnel lens to be in the vicinity of n+0.5 (n: integer). However, when the pitch $p_L$ of the lenticular lenses becomes small, the pitches of the primary moiré patterns (elliptical moiré and hyperbolic moiré) also become small. For this reason, with respect to the primary moiré patterns, even if they are present, it is not a problem because their pitches are small.

Therefore, when the pitch $p_L$ of the lenticular lenses is small, it is particularly important to reduce the secondary moiré pattern that is produced by the elliptical moiré and the hyperbolic moiré. To reduce the secondary moiré pattern, it is necessary that the pitch ratio $p_E/p_H$ or $p_H/p_E$ between the primary moiré patterns, wherein $p_E$ is the pitch of the elliptical moiré, and $p_H$ is the pitch of the hyperbolic moiré (the pitch on the axis connecting two focal points, or the pitch of the lenticular lenses on their repeating direction), be allowed to be in the vicinity of n'+0.5 (n': integer). When the pitch ratio $p_L/p_F$ or $p_F/p_L$ between the lenticular lenses and the Fresnel lens is allowed to be in the vicinity of n+0.4, or of n+0.6 (n: integer), it is possible to make the pitch ratio $p_E/p_H$ or $p_H/p_E$ between the primary moiré patterns n'+0.5. However, when the pitch ratio $p_L/p_F$ or $p_F/p_L$ between the lenticular lenses and the Fresnel lens is in the vicinity of n+0.5 (n+0.4, n+0.6), the pitches of the primary moiré patterns become close to each other (the integer part (n') of the pitch ratio becomes 1), so that the secondary moiré pattern inevitably becomes strong.

Therefore, in the present invention, the intensity of the secondary moiré pattern is reduced by allowing the pitch ratio $p_E/p_H$ or $p_H/p_E$ between the primary moiré patterns to be in the vicinity of 2.5, or more (the integer part (n') of the pitch ratio is 2 or more). When the pitch ratio $p_E/p_H$ or $p_H/p_E$ is made less than 2.4, the secondary moiré pattern becomes conspicuous, so that it is desirable that the pitch ratio $p_E/p_H$ or $p_H/p_E$ between the primary moiré patterns be in the relationship represented by the following inequality (1), with a lower limit of 2.4:

$$p_E/p_H \geq 2.4 \text{ or } p_H/p_E \geq 2.4 \qquad (1)$$

It is desirable that the pitch ratio $p_E/p_H$ or $p_H/p_E$ between the primary moiré patterns be in the vicinity of 2.5, 3.5 or 4.5, that is, $p_E/p_H$ or $p_H/p_E$ be in the range of 2.4–2.6, 3.4–3.6, or 4.4–9.0.

By the way, the relationship represented by the following equalities (2) and (3), or (4) and (5) is present between the pitch $p_E$ of the elliptical moiré and the pitch $p_H$ of the hyperbolic moiré, and between the pitch $p_L$ of the lenticular lenses and the pitch $p_F$ of the Fresnel lens, provided that [X] in the following equalities means the integer part of X: in the case where $p_L > p_F$, $$p_E=1.0/(1.0/p_F-[p_L/p_F]/p_L) \quad (2)$$

$$p_H=1.0/(1.0/p_L-1.0/p_F+[p_L/p_F]/p_L) \quad (3), \text{ and}$$

in the case where $p_F>p_L$, $$p_H=1.0/(1.0/p_L-[p_F/p_L]/p_F) \quad (4)$$

$$p_E=1.0/(1.0/p_F-1.0/p_L+[p_F/p_L]/p_F) \quad (5)$$

Therefore, to select the pitch ratio $p_E/pH$ or $p_H/p_E$ between the primary moiré patterns from the above-described range of 2.4–2.6, 3.4–3.6, or 4.4–9.0 means to select the pitch ratio $p_L/p_F$ or $p_F/p_L$ between the lenticular lenses and the Fresnel lens from the range of 1.1–1.3, or 1.7–1.9. When the pitch ratio $p_L/p_F$ or $p_F/p_L$ is smaller than 1.1 or greater than 1.9, the pitch ratio $p_L/p_F$ or $p_F/p_L$ becomes close to 1 or 2, and the primary moiré pattern becomes conspicuous. On the contrary, when the pitch ratio $p_L/p_F$ or $p_F/p_L$ is greater than 1.3 and smaller than 1.7, the pitch ratio $p_L/p_F$ or $p_F/p_L$ becomes close to 1.5, and the secondary moiré pattern becomes conspicuous as mentioned above.

As described above, in the case where the pitch ratio $p_E/p_H$ or $p_H/p_E$ between the primary moiré patterns is allowed to fulfill the above equality (1), it is possible to decrease the intensity of the secondary moiré pattern, thereby making the secondary moiré pattern obscure. However, even in this case, the pitches of the primary moiré patterns may become large, and the primary moiré patterns thus become conspicuous. Therefore, in the present invention, it is proper that greater one of the pitch $p_E$ of the elliptical moiré and the pitch $p_H$ of the hyperbolic moiré be made smaller than 1.5 mm, at which these moiré patterns are recognized by an observer as being separated. Namely, it is proper to make the pitch $p_E$ of the elliptical moiré and the pitch $p_H$ of the hyperbolic moiré fulfill the following inequality (6):

$$MAX(p_E, p_H) < 1.5 \text{ mm} \quad (6)$$

It is noted that the aforementioned pitch ratios $p_E/p_H$ or $p_H/p_E$, and $p_L/p_F$ or $p_F/p_L$ are particularly effective when the pitch $p_L$ of the lenticular lenses is 0.3 mm or less.

EXAMPLES

Next, specific examples of the foregoing embodiment will now be described. In these examples, projection screens as shown in the following Table 1 (Examples 1 to 12) in which the Fresnel lenses had different pitches $p_F$ were prepared as the projection screen comprising a Fresnel lens and lenticular lenses in combination. It is noted that the pitch pL of the lenticular lenses was made 0.15 mm in all of Examples 1 to 12.

TABLE 1

| Example | $p_L$ | $p_F$ | $p_L/p_F$ | $p_E$ | $p_H$ | $p_E/p_H$ or $p_H/p_E$ |
|---|---|---|---|---|---|---|
| 1 | 0.15 | 0.1360 | 1.1029 | 1.457 | 0.167 | 8.7 |
| 2 | 0.15 | 0.1265 | 1.1858 | 0.807 | 0.184 | 4.4 |
| 3 | 0.15 | 0.1232 | 1.2175 | 0.690 | 0.192 | 3.6 |
| 4 | 0.15 | 0.1222 | 1.2275 | 0.659 | 0.194 | 3.4 |
| 5 | 0.15 | 0.1174 | 1.2777 | 0.540 | 0.208 | 2.6 |
| 6 | 0.15 | 0.1159 | 1.2942 | 0.510 | 0.213 | 2.4 |
| 7 | 0.15 | 0.0880 | 1.7045 | 0.213 | 0.508 | 2.4 |
| 8 | 0.15 | 0.0871 | 1.7222 | 0.208 | 0.540 | 2.6 |
| 9 | 0.15 | 0.0846 | 1.7330 | 0.194 | 0.661 | 3.4 |
| 10 | 0.15 | 0.0841 | 1.7836 | 0.191 | 0.693 | 3.6 |

TABLE 1-continued

| Example | $p_L$ | $p_F$ | $p_L/p_F$ | $p_E$ | $p_H$ | $p_E/p_H$ or $p_H/p_E$ |
|---|---|---|---|---|---|---|
| 11 | 0.15 | 0.0827 | 1.8138 | 0.184 | 0.806 | 4.4 |
| 12 | 0.15 | 0.0790 | 1.8987 | 0.167 | 1.481 | 8.9 |

In the above Table 1, $p_L$: the pitch (mm) of the lenticular lenses, $p_F$: the pitch (mm) of the Fresnel lens, $p_E$: the pitch (mm) of the elliptical moiré, and $p_H$: the pitch (mm) of the hyperbolic moiré.

Further, the condition in the above Table 1 is that the pitches of the primary moiré patterns are not more than 10 times the pitch of the lenticular lenses.

In terms of Examples 1 to 12 shown in the above Table 1, a projected image on the projection screen was observed. As a result, it was found that both the primary and secondary moiré patterns were practically obscure in all of Examples 1 to 12.

In the cases of the above-described Examples 1 to 12, when the aforementioned desirable range (2.4–2.6, 3.4–3.6, or 4.4–9.0) of the pitch ratio $p_E/p_H$ or $p_H/p_E$ between the primary moiré patterns is taken into consideration, it can be known that it is particularly desirable that the pitch ratio $p_L/p_F$ or $p_F/p_L$ between the lenticular lenses and the Fresnel lens be in the range of:

1.1029–1.1858, 1.2175–1.2275, 1.2777–1.2942, 1.7045–1.7222, 1.7730–1.7836, or 1.8138–1.8987.

Comparative Examples

Next, Comparative Examples for the above-described Examples 1 to 12 will be described. In these examples, projection screens as shown in the following Table 2 (Comparative Examples 1 to 7) in which the Fresnel lenses had different pitches $p_F$ were prepared as the projection screen comprising a Fresnel lens and lenticular lenses in combination. It is noted that the pitch $p_L$ of the lenticular lenses was made 0.15 mm in all of Comparative Examples 1 to 7.

TABLE 2

| Comparative Example | $p_L$ | $p_F$ | $p_L/p_F$ | $p_E$ | $p_H$ | $p_E/p_H$ |
|---|---|---|---|---|---|---|
| 1 | 0.15 | 0.1000 | 1.5000 | 0.300 | 0.300 | 1.000 |
| 2 | 0.15 | 0.1071 | 1.4006 | 0.374 | 0.250 | 1.496 |
| 3 | 0.15 | 0.1111 | 1.3501 | 0.428 | 0.231 | 1.853 |
| 4 | 0.15 | 0.1364 | 1.0997 | 1.504 | 0.167 | 9.006 |
| 5 | 0.15 | 0.0789 | 1.9011 | 0.166 | 1.517 | 9.139 |
| 6 | 0.15 | 0.0938 | 1.5991 | 0.250 | 0.374 | 1.496 |
| 7 | 0.15 | 0.0909 | 1.6502 | 0.231 | 0.429 | 1.857 |

In terms of Comparative Examples 1 to 7 shown in the above Table 2, a projected image on the projection screen was observed. As a result, a secondary moiré pattern was strongly produced in Comparative Examples 1, 2, 3, 6 and 7, so that it was impossible to normally use these projection screens. Further, in Comparative Examples 4 and 5, primary moiré patterns were strongly produced, so that it was impossible to normally use these projection screens.

FIG. 4 is a view showing the secondary moiré pattern produced in the above-described Example 6; and FIG. 5 is a view showing the secondary moiré pattern produced in the above-described Comparative Example 2. As shown in FIGS. 4 and 5, it can be known that the moiré pattern shown in FIG. 4 is less conspicuous than that shown in FIG. 5.

Specific examples of the projection screen to which the present invention is applied have thus been described. However, the present invention is not limited to these examples, and can be modified variously. In addition, the projection screen to which the present invention is applied is not limited to those ones whose constitutions are shown in FIGS. 1 and 3A, and in FIGS. 2 and 3B; and the present invention is also applicable to any of such constitutions that a projection screen contains a Fresnel lens face and a lenticular lens face.

What is claimed is:

1. A projection screen comprising a Fresnel lens and lenticular lenses in combination, wherein, when the pitch of the lenticular lenses is indicated by $p_L$, and the pitch of the Fresnel lens is indicated by $p_F$, and when $p_E$ and $p_H$ are defined as follows: in the case where $p_L > p_F$, $$p_E = 1.0/(1.0/p_F - [p_L/p_F]/p_L) \qquad (i)$$

$$p_H = 1.0/(1.0/p_L - 1.0/p_F + [p_L/p_F]/p_L) \qquad (ii), \text{ and}$$

in the case where $p_F > p_L$, $$p_H = 1.0/(1.0/p_L - [p_F/p_L]/p_F) \qquad (iii)$$

$$p_E = 1.0/(1.0/p_F - 1.0/p_L + [p_F/p_L]/p_F) \qquad (iv)$$

([X]: the integer part of X), the relationship $$p_E/p_H \geq 2.4 \text{ or } p_H/p_E \geq 2.4$$

is fulfilled.

2. The projection screen according to claim 1, wherein $p_E$ and $p_H$ further fulfill the following relationship:

$$\text{MAX}(p_E, p_H) < 1.5 \text{ mm}.$$

3. The projection screen according to claim 1, wherein $p_E/p_H$ or $p_H/p_E$ is in the range of 2.4–2.6, 3.4–3.6, or 4.4–9.0.

4. The projection screen according to claim 1, wherein $p_L/p_F$ or $p_F/p_L$ is in the range of 1.1–1.3, or 1.7–1.9.

5. The projection screen according to claim 1, wherein $p_L$ is 0.3 mm or less.

* * * * *